United States Patent
Izadi et al.

(10) Patent No.: US 12,093,830 B2
(45) Date of Patent: Sep. 17, 2024

(54) CONTINUOUS PARAMETRIZATIONS OF NEURAL NETWORK LAYER WEIGHTS

(71) Applicant: Google LLC, Mountain View, CA (US)

(72) Inventors: Shahram Izadi, Tiburon, CA (US); Cem Keskin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 836 days.

(21) Appl. No.: 16/976,805

(22) PCT Filed: Jul. 23, 2019

(86) PCT No.: PCT/US2019/042989
§ 371 (c)(1),
(2) Date: Aug. 31, 2020

(87) PCT Pub. No.: WO2020/023483
PCT Pub. Date: Jan. 30, 2020

(65) Prior Publication Data
US 2021/0365777 A1  Nov. 25, 2021

Related U.S. Application Data

(60) Provisional application No. 62/702,055, filed on Jul. 23, 2018.

(51) Int. Cl.
*G06N 3/084* (2023.01)
*G06F 18/213* (2023.01)
(Continued)

(52) U.S. Cl.
CPC ............ *G06N 3/084* (2013.01); *G06F 18/213* (2023.01); *G06N 3/048* (2023.01); *G06N 3/08* (2013.01)

(58) Field of Classification Search
CPC .......... G06N 3/048; G06N 3/08; G06N 3/084; G06F 18/213
See application file for complete search history.

(56) References Cited

U.S. PATENT DOCUMENTS

| | | | |
|---|---|---|---|
| 2017/0024643 | A1 | 1/2017 | Lillicrap et al. |
| 2017/0357896 | A1 | 12/2017 | Tsatsin et al. |
| 2018/0096259 | A1 | 4/2018 | Andrews et al. |

FOREIGN PATENT DOCUMENTS

| | | |
|---|---|---|
| CN | 106055846 | 10/2016 |
| CN | 107690663 | 2/2018 |

(Continued)

OTHER PUBLICATIONS

Wu et al., Quantized Convolutional Neural Networks for Mobile Devices, May 2016. (Year: 2016).*

(Continued)

*Primary Examiner* — Marshall L Werner
(74) *Attorney, Agent, or Firm* — Fish & Richardson P.C.

(57) ABSTRACT

Methods, systems, and apparatus for more efficiently and accurately generating neural network outputs, for instance, for use in classifying image or audio data. In one aspect, a method includes processing a network input using a neural network including multiple neural network layers to generate a network output. One or more of the neural network layers is a conditional neural network layer. Processing a layer input using a conditional neural network layer to generate a layer output includes obtaining values of one or more decision parameters of the conditional neural network layer. The neural network processes the layer input and the decision parameters of the conditional neural network layer to determine values of one or more latent parameters of the conditional neural network layer from a continuous set of possible latent parameter values. The values of the latent parameters specify the values of the conditional layer weights.

20 Claims, 5 Drawing Sheets

(51) Int. Cl.
    *G06N 3/048*    (2023.01)
    *G06N 3/08*    (2023.01)

(56) References Cited

FOREIGN PATENT DOCUMENTS

| CN | 108052989 | 5/2018 |
|---|---|---|
| CN | 108229663 | 6/2018 |
| JP | 2000242623 | 9/2000 |

OTHER PUBLICATIONS

Brabandere et al., Dynamic Filter Networks, Jun. 2016. (Year: 2016).*

Murdock et al., Additive Component Analysis, 2017 IEEE Conference on Computer Vision and Pattern Recognition, Jul. 2017. (Year: 2017).*

PCT International Preliminary Report of Patentability in International Application No. PCT/US2019/042989, dated Feb. 4, 2021, 8 pages.

Abadi et al., "TensorFlow: Large-scale machine learning on heterogeneous systems," Software available from tensorflow.org, Nov. 2015, 19 pages.

Baek et al., "Deep convolutional decision jungle for image classification," arXiv preprint arXiv:1706.02003, Jun. 2017, 12 pages.

Biçici et al., "Conditional information gain networks," 2018 24th International Conference on Pattern Recognition (ICPR), Aug. 2018, 1390-1395.

Brabandere et al., "Dynamic filter networks," Advances in neural information processing systems, 2016, 667-675.

Chen et al., "Infogan: Interpretable representation learning by information maximizing generative adversarial nets," Advances in neural information processing systems, 2016, 2172-2180.

Denoyer et al., "Deep sequential neural network," arXiv preprint arXiv:1410.0510, Oct. 2014, 9 pages.

Ha et al., "HyperNetworks," arXiv preprint arXiv:1609.09106, 2016, 29 pages.

Han et al., "Deep compression: Compressing deep neural networks with pruning, trained quantization and huffman coding," arXiv preprint arXiv:1510.00149, Oct. 2015.

He et al., "Deep residual learning for image recognition," Proceedings of the IEEE conference on computer vision and pattern recognition, 2016, 770-778.

Hinton et al., "Improving neural networks by preventing co-adaptation of feature detectors," arXiv preprint arXiv:1207.0580, Jul. 2012, 18 pages.

Holden et al., "Phase-functioned neural networks for character control," ACM Transactions on Graphics (TOG), Jul. 2017, 36(4):1-3.

Iandola et al., "SqueezeNet: AlexNet-level accuracy with 50x fewer parameters and< 0.5 MB model size," arXiv preprint arXiv:1602.07360, Feb. 2016, 13 pages.

Ioannou et al., "Decision forests, convolutional networks and the models inbetween," arXiv preprint arXiv:1603.01250, Mar. 2016.

Jaderberg et al., "Spatial transformer networks," arXiv preprint arXiv:1506.02025, 2015, 15 pages.

Jia et al., "Dynamic filter networks," Advances in neural information processing systems, 2016, 667-675.

Keskin et al., "SplineNets: Continuous Neural Decision Graphs," InAdvances in Neural Information Processing Systems, 2018, 1994-2004.

Kingma et al., "Auto-encoding variational bayes," arXiv preprint arXiv:1312.6114, Dec. 2013, 14 pages.

Kontschieder et al., "Deep neural decision forests," Proceedings of the IEEE international conference on computer vision, 2015, 1467-1475.

LeCun et al., "Gradient-based learning applied to document recognition," Proceedings of the IEEE, Nov. 1998, 86(11):2278-324.

Lillicrap et al., "Continuous control with deep reinforcement learning," arXiv preprint arXiv:1509.02971, Sep. 2015, 14 pages.

Molchanov et al., "Pruning convolutional neural networks for resource efficient inference," arXiv preprint arXiv:1611.06440, Nov. 2016, 17 pages.

Murdock et al., "Additive component analysis," Proceedings of the IEEE Conference on Computer Vision and Pattern Recognition, 2017, 2491-2499.

PCT International Search Report and Written Opinion in International Appln. No. PCT/US2019/042989, dated Oct. 16, 2019, 14 pages.

Rastegari et al., "Xnor-net: Imagenet classification using binary convolutional neural networks," European conference on computer vision, Oct. 2016, 525-542.

Rota Bulo et al., "Neural decision forests for semantic image labelling," Proceedings of the IEEE Conference on Computer Vision and Pattern Recognition, 2014, 81-88.

Sabour et al., "Dynamic routing between capsules," Advances in neural information processing systems, 2017, 3856-3866.

Shazeer et al., "Outrageously large neural networks: The sparsely-gated mixture-ofexperts layer," arXiv preprint arXiv:1701.06538, Jan. 2017, 19 pages.

Shotton et al., "Decision jungles: Compact and rich models for classification," Advances in Neural Information Processing Systems, 2013, 234-242.

Wang et al., "Using a random forest to inspire a neural network and improving on it," Proceedings of the 2017 SIAM international conference on data mining, Jun. 1-9, 2017.

Wu et al., "Quantized convolutional neural networks for mobile devices," Proceedings of the IEEE Conference on Computer Vision and Pattern Recognition, 2016, 4820-4828.

Xiong et al., "Conditional convolutional neural network for modality-aware face recognition," Proceedings of the IEEE International Conference on Computer Vision, 2015, 3667-3675.

Yang et al., "Designing energy-efficient convolutional neural networks using energy-aware pruning," Proceedings of the IEEE Conference on Computer Vision and Pattern Recognition, 2017, 5687-5695.

Zhou et al., "Incremental network quantization: Towards lossless cnns with low-precision weights," arXiv preprint arXiv:1702.03044, Feb. 2017, 14 pages.

EP Office Action in European Application No. 19749159.0, dated Dec. 1, 2021, 8 pages.

Feng et al., "Fuzzy Neural Network based on B-Spline Function" High Technology Communication No. 12, Mar. 1998, 35-39 (with English abstract).

Office Action in Chinese Appln. No. 201980020210.8, mailed on Aug. 30, 2023, 23 pages (with English translation).

Notice of Allowance in Chinese Appln. No. 201980020210.8, mailed on Feb. 2, 2024, 6 pages (with English translation).

* cited by examiner

CONTINUOUS PARAMETRIZATIONS OF NEURAL NETWORK LAYER WEIGHTS

CROSS-REFERENCE TO RELATED APPLICATION

This application is a National Stage Application under 35 U.S.C. § 371 and claims the benefit of International Application No. PCT/US2019/042989, filed Jul. 23, 2019, which claims priority to U.S. Application No. 62/702,055, filed Jul. 23, 2018, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a neural network system implemented as computer programs on one or more computers in one or more locations that includes one or more conditional neural network layers.

According to a first aspect there is provided a method implemented by a data processing apparatus. The method includes processing a network input using a neural network including multiple neural network layers to generate a network output. Each neural network layer is configured to process a respective layer input in accordance with respective values of multiple layer weights to generate a respective layer output. One or more of the neural network layers is a conditional neural network layer.

Processing a layer input using a conditional neural network layer to generate a layer output includes obtaining values of one or more decision parameters of the conditional neural network layer. The neural network processes the layer input and the decision parameters of the conditional neural network layer to determine values of one or more latent parameters of the conditional neural network layer from a continuous set of possible latent parameter values. The values of the latent parameters specify the values of the conditional layer weights. The neural network determines the values of the conditional layer weights from the values of the latent parameters and processes the layer input in accordance with the values of the conditional layer weights to generate the layer output.

In some implementations processing the layer input and the decision parameters of the conditional neural network layer, to determine the values of the latent parameters of the conditional neural network layer from a continuous set of possible latent parameter values includes applying a differentiable mapping, the differentiable mapping being a mapping of the layer input and decision parameters to the values of the latent parameters of the conditional neural network.

In some implementations applying the differentiable mapping includes determining an inner product between the layer input and the decision parameters of the conditional neural network layer and processing the inner product by a sigmoid function.

In some cases, the neural network determines the values of the latent parameters of the conditional neural network layer to be an output of the differentiable mapping, for instance, an output of the sigmoid function.

In some cases, the neural network determines the values of the latent parameters of the conditional neural network layer from an output of the differentiable mapping (for instance, the output of the sigmoid function) and values of latent parameters of a preceding conditional neural network layer in the neural network. The preceding conditional neural network layer is a conditional neural network layer that precedes the conditional neural network layer in an ordering of the neural network layers of the neural network. In this case, the values of the latent parameters may be determined to be a (weighted) linear combination of the output of the differentiable mapping and the values of the latent parameters of the preceding conditional neural network layer. The preceding conditional neural network layer may directly precede the conditional neural network layer and may provide the layer input.

In some implementations, the continuous set of possible latent parameter values is the interval between 0 and 1.

In some implementations, the latent parameters of the conditional neural network layer parameterize the conditional layer weights (e.g., as a B-spline defined by multiple knots which are determined during training). The neural network can determine the values of the conditional layer Weights from the values of the latent parameters in accordance with the parametrization of the conditional layer weights by the latent parameters.

In some implementations, the latent parameters of the conditional neural network layer parametrize the conditional layer weights as a B-spline or as a hypersurface defined as a sum of multiple B-splines. The latent parameters may define a position along the B-spline or a position on the hypersurface.

In some implementations, each B-spline is defined by multiple knots, and values of the knots defining the B-spline are determined during training.

In some implementations, the conditional layer weights include weights of multiple convolutional filters. In some of these implementations, the latent parameters of the conditional neural network layer parametrize multiple nested latent parameters of the conditional neural network layer, and each nested latent parameter of the conditional neural network layer parametrizes the weights of a corresponding convolutional filter. The neural network can determine values of the nested latent parameters from the values of the latent parameters in accordance with the parametrization of the nested latent parameters by the latent parameters. Subsequently, for each convolutional filter, the neural network can determine values of the weights of the convolutional filter from the value of the nested latent variable corresponding to the convolutional filter in accordance with the parametrization of the weights of the convolutional filter by the corresponding nested latent variable.

In some implementations, the number of latent parameters of the conditional neural network layer is less than the dimensionality of the conditional layer weights.

In some implementations, the values of the decision parameters of the conditional neural network layer are determined when the neural network is trained. In some other implementations, the neural network determines the values of the decision parameters of the conditional neural network layer from values of one or more latent parameters of a preceding conditional neural network layer. For example, the latent parameters of the preceding conditional neural network layer may parametrize (e.g., as a B-spline defined by multiple knots which are determined during training) the decision parameters of the conditional neural network layer. In this example, the neural network may determine the values of the decision parameters of the conditional neural network layer from the values of the latent parameters of the preceding conditional neural network layer in accordance with the parametrization. In some implementations, the latent parameters of the preceding conditional neural network layer parameterize the decision parameters of the conditional neural network layer as a B-spline or as a hypersurface defined as a sum of multiple B-splines. Each B-spline may be defined by multiple knots, and values of the knots defining the B-spline may be determined during training.

In some implementations, the neural network is trained based on a set of training data comprising multiple training examples to jointly optimize: (i) an accuracy of the neural network, and (ii) a measure of mutual information between the values of the latent parameters of the conditional neural network layer and labels for the training examples included in the training data. The measure of mutual information can be determined using a soft quantization function.

In some implementations, the network input comprises an image or audio signal and the network output comprises data characterizing the image or audio signal.

In some implementations, there is provided a method of training a system as described herein, wherein the method comprises determining, for each conditional neural network layer, a continuous function for mapping one or more latent parameters for the conditional neural network layer to the conditional layer weights.

In some implementations, the network input comprises an image and the network output characterizes a classification of the image into a predetermined set of categories (i.e., the network is configured to perform image classification tasks). The categories may correspond to, e.g., categories of object that are depicted in the image (e.g., person, boat, vehicle, etc.).

In some implementations, the network input comprises an image and the network output characterizes a natural language caption directed to contents of the image (i.e., the network is configured to perform image captioning tasks).

In some implementations, the network input comprises an audio signal and the network output characterizes words spoken in the audio signal (i.e., the network is configured to perform speech recognition tasks).

According to an aspect, there is provided one or more non-transitory computer storage media storing instructions that when executed by one or more computers cause the one or more computers to perform operations of any of the above methods.

According to an aspect, there is provided a system including one or more computers and one or more storage devices storing instructions that when executed by the one or more computers cause the one or more computers to perform the operations of any of the above methods.

Particular embodiments of the subject matter described in this specification can be implemented so as to realize one or more of the following advantages.

By including one or more conditional neural network layers as described in this specification, a neural network can generate network outputs with an accuracy comparable to (or higher than) some conventional neural networks while consuming fewer computational resources (e.g., memory and computing power). For example, the neural network can dynamically determine the values of the conditional layer weights used to process a conditional layer input, unlike some conventional neural network layers where the values of the layer weights are fixed during inference. This can enable the conditional neural network layer to effectively increase the model complexity of the neural network to achieve higher accuracy levels while, in some cases, minimally affecting computational resource consumption by the neural network.

Moreover, a conditional neural network layer as described in this specification can dynamically determine the values of the conditional layer weights used to process a conditional layer input from amongst an infinite set of possible conditional layer weights. In contrast, for some conventional neural network layers, even when the values of the layer weights can be dynamically determined from the layer inputs, they can only be selected from a finite set of possible layer weights. Compared to these conventional neural network layers, the conditional neural network layer as described in this specification allows a greater increase in model complexity while, in some cases, minimally affecting computational resource consumption by the neural network.

The operations performed by the conditional neural network layer described in this specification to dynamically determine the conditional layer weights from the conditional layer input are differentiable. Therefore, the neural network can be trained from end-to-end using gradients of an objective function with respect to the neural network parameters. In particular, the differentiability of the operations performed by conditional layers can enable the neural network to be trained more effectively than some conventional neural network layers that dynamically select layer weights from a finite set of possible layer weights using non-differentiable operations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network having a set of neural network layers, where one or more of the neural network layers are "conditional" neural network layers.

A conditional layer is configured to receive a layer input, and to process the layer input in accordance with the values of a set of conditional layer weights to generate a layer output. The conditional layer is "dynamic", that is, the conditional layer dynamically determines the values of the conditional layer weights based on the layer input. More specifically, to determine the values of the conditional layer weights, the conditional layer uses a differentiable mapping parameterized by a set of "decision parameters" to project the layer input onto one or more "latent parameters". The latent parameters collectively specify the conditional layer weights, e.g., by parametrizing the conditional layer weights by one or more differentiable functions, e.g., B-splines. Dynamically selecting the conditional layer weights based on the layer input can increase the representational capacity of the conditional layer and enable the conditional layer to generate richer layer outputs. Moreover, the conditional layer determines the conditional layer weights using an end-to-end differentiable procedure, which facilitates training the conditional neural network (e.g., using backpropagation techniques) to generate accurate prediction outputs.

In some implementations, the conditional layers of the neural network may be "hierarchical" as well as dynamic, that is, for one or more of the conditional layers, the neural network may condition the decision parameters for the conditional layer on the latent parameters of a preceding conditional layer. Being hierarchical may further increase the representational capacity of the conditional layers, thereby enabling the conditional layers to generate richer layer outputs that can result in the neural network generating more accurate prediction outputs.

The methods and systems described herein may be applied to classifying (or otherwise characterizing) image and/or audio data. Accordingly, the neural network may be an image classifier or an audio classifier, for instance, for use in speech recognition. These features and other features are described in more detail below.

Figure 1:
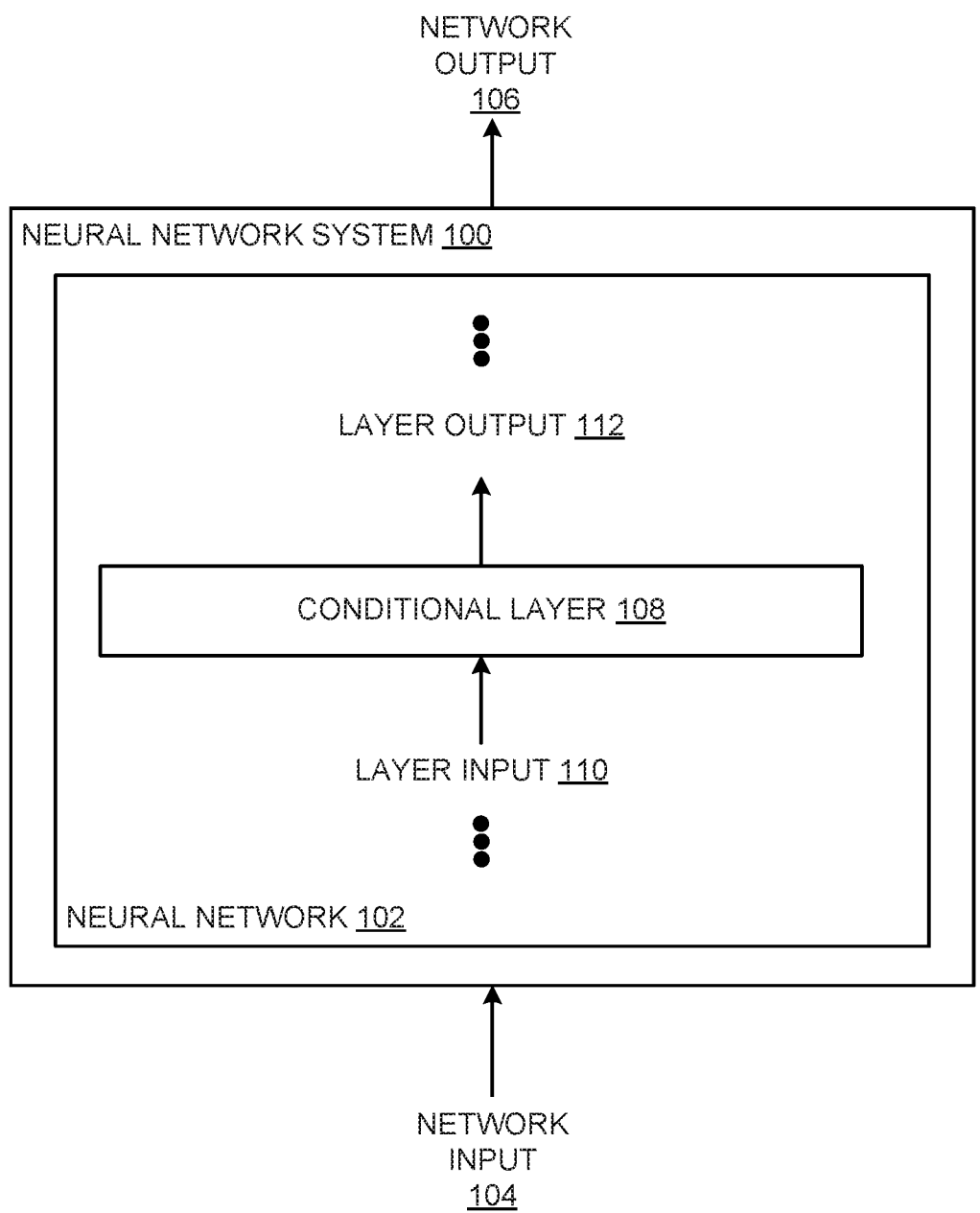
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

The neural network system 100 includes a neural network 102, which can be a feed-forward neural network, a recurrent neural network, or any other appropriate type of neural network. The neural network 102 is configured to receive a network input 104 and to generate a network output 106 from the network input 104. The network input 104 can be any kind of digital data input, and the network output 106 can be any kind of score, classification, or regression output based on the input.

The system 100 described herein is widely applicable and is not limited to one specific implementation. However, for illustrative purposes, a small number of example implementations are described below.

In one example, the input to the neural network 102 may be an image or features that have been extracted from an image. In this example, the output generated by the neural network 102 for the image may be a respective score for each of a set of object categories, with the score for each category representing an estimated likelihood that the image depicts an object belonging to the category.

In another example, the input to the neural network 102 may be a sequence of text in one (natural) language, and the output generated by the neural network 102 may be a score for each of a set of pieces of text in another language. The score for each piece of text in the other language may represent an estimated likelihood that the piece of text is a proper translation of the input text into the other language.

In another example, the input to the neural network 102 may be a sequence representing a spoken utterance, and the output generated by the neural network 102 may be a respective score for each of a set of pieces of text. The score for each piece of text may represent an estimated likelihood that the piece of text is the correct transcription of the utterance.

In another example, the input to the neural network 102 may be a sequence of physiological measurements of a user, and the output generated by the neural network 102 may be a respective score for each of a set of possible diagnoses for the condition of the user. The score for each diagnosis may represent an estimated likelihood that the diagnosis is accurate.

In another example, the input to the neural network 102 may be a sequence of text from a communication received from a user, and the output generated by the neural network 102 may be a respective score for each of a set of possible responses to the received communication. The score for each response may represent an estimated likelihood that the response matches the intention of the user.

The neural network 102 includes one or more conditional neural network layers (e.g., the conditional layer 108), and may optionally include one or more other neural network layers (i.e., that differ from the conditional layers described in this document).

As will be described further with reference to FIG. 1, the conditional layer 108 is configured to receive a layer input 110, and to process the layer input 110 in accordance with the values of the conditional layer weights to generate a layer output 112. Generally, the layer input 110 may be the network input 104 (i.e., if the conditional layer 108 is an input layer in the neural network 102) or the output of another layer of the neural network 102 (e.g., another conditional layer). The layer input 110 and the layer output 112 may be represented as ordered collections of numerical values, e.g., vectors or matrices of numerical values.

The system 100 can be implemented in a resource-constrained environment (e.g., a mobile device) more readily than conventional neural network systems. For example, by including conditional layers (e.g., the conditional layer 108), data defining the parameters of the system 100 can occupy much less storage capacity than data defining the parameters of a conventional neural network system.

Figure 2:
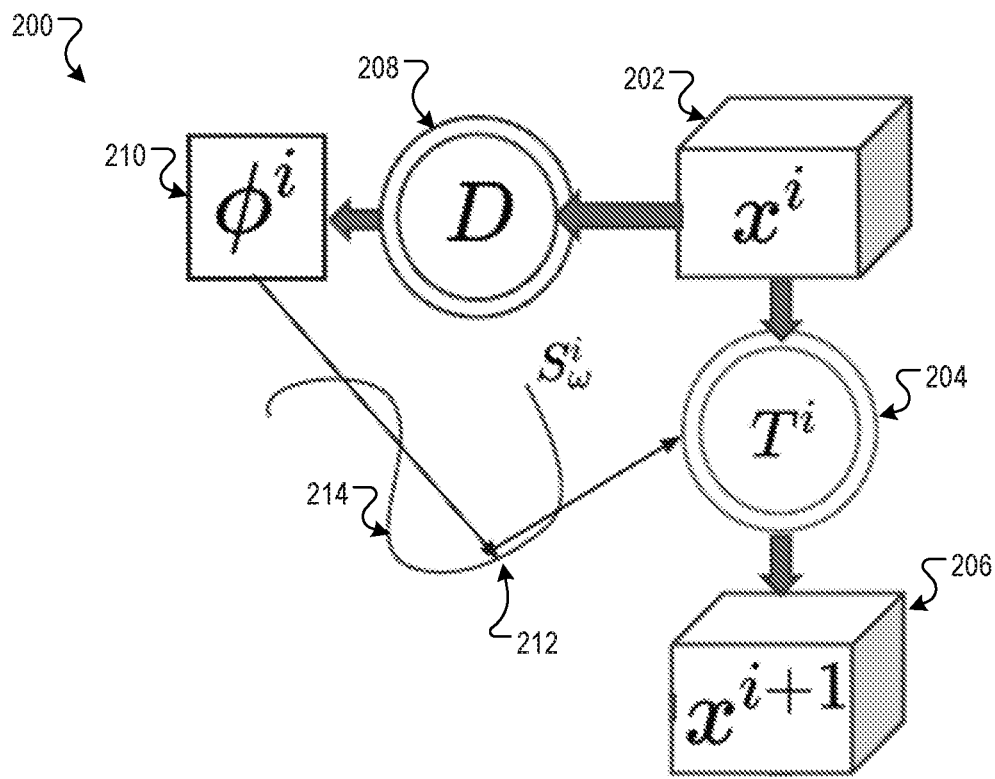
FIG. 2 illustrates a block diagram of an example conditional layer.

FIG. 2 illustrates a block diagram of an example conditional layer 200. The conditional layer 200 is configured to process the layer input 202 in accordance the values of a set of conditional layer weights 204 to generate the layer output 206. In one example, the conditional layer weights may be fully-connected layer weights, e.g., represented by a point in $\mathbb{R}^{M,N}$ where M is the dimensionality of the layer output 206 and N is the dimensionality of the layer input. In this example, the conditional layer 200 may generate the layer output 206 by applying an M×N weight matrix defined by the conditional layer weights to the layer input 202. In another example, the conditional layer weights may be convolutional filter weights, e.g., two-dimensional (2-D) convolutional filter weights that are represented by a point in $\mathbb{R}^{h,w,c,f}$, where h is the height and w is the width of the 2D convolutional filters, c is the number of input channels, and f is the number of filters. In this example, the conditional layer 200 may generate the layer output 206 by applying each of the h×w×c convolutional filters to the layer input 202.

Prior to processing the layer input 202 using the conditional layer weights 204, the conditional layer 200 is configured to dynamically determine the conditional layer weights 204 based on the layer input 202. To determine the conditional layer weights 204, the conditional layer 200 uses a set of decision parameters 208 to project (i.e., map) the conditional layer input 202 onto a set of one or more latent parameters 210 that implicitly specify the values of the conditional layer weights 204. In one example, the latent parameters 210 may parametrize the values of the conditional layer weights as a B-spline (or a sum of B-splines), as will be described in more detail below.

Each of the latent parameters 210 is a continuous variable, i.e., can assume any value in a continuous range of possible latent parameter values, e.g., the continuous interval [0,1]. In some cases, different latent parameters may have different continuous ranges of possible values, e.g., one latent parameter may have [0,1] as its continuous range of possible values, while another latent parameter may have [1,2] as its continuous range of possible values. Projecting the layer input 202 onto latent parameters 210 having a continuous range of possible values enables the conditional layer 200 to select a particular set of conditional layer weights from a set of infinitely many possible conditional layer weights. This enables the conditional layer to have a higher representational capacity than, e.g., a neural network layer with predetermined layer weights, or a "finite" conditional neural network layer that selects the conditional layer weights from a finite set of possible layer weights.

In some cases, the decision parameters 208 of the conditional layer may have static values that are determined during training of the neural network, e.g., by iterative optimization using stochastic gradient descent. In other cases, rather than having static values, the values of the decision parameters 208 may vary depending on the network input being processed by the neural network. In one example, the conditional layer 200 may determine the values of the decision parameters 208 based on the latent parameter values of a preceding conditional neural network layer, as will be described in more detail with reference to FIG. 4.

The conditional layer 200 may project the layer input 202 onto the latent parameters 210 using any appropriate differentiable mapping. A few examples follow.

In one example, the conditional layer 200 may have a single latent parameter φ that is the result of an inner product (i.e., dot product) between the layer input x and the decision parameters θ, i.e.:

$$\phi = \sigma(<X, \theta>) \quad (1)$$

where <•,•> refers to the inner product operation, σ is a sigmoid activation function that maps the values of the latent parameter into the range [0,1], and the layer input x and the decision parameters θ are both flattened into vectors before being processed using the inner product operation.

In another example, the conditional layer 200 may have multiple latent parameters, each of which are determined as the result of an inner product between the layer input and a respective subset of the decision parameters, e.g., as described with reference to equation (1).

In another example, the conditional layer 200 may have a single latent parameter that is the result of processing the layer input 202 using a 1×1 convolutional filter, followed by a sigmoid activation function and a global averaging operation, i.e., that averages every component of the output of the convolutional layer. In this example, the decision parameters define the values of the components of the 1×1 convolutional filter of the convolutional layer, e.g., by a vector having a dimensionality equal to the number of channels of the layer input.

In another example, the conditional layer 200 may have multiple latent parameters, each of which are determined as the result of processing the layer input 202 using a respective 1×1 convolutional filter followed by a sigmoid activation function and a global averaging operation.

After determining the latent parameter values 210, the conditional layer 200 uses the latent parameter values 210 to determine the values of the conditional layer weights 204. Generally, the latent parameters 210 parameterize the conditional layer weights by one or more differentiable functions. That is, the conditional layer 200 determines the values of the conditional layer weights as the result of applying one or more differential functions to the latent parameter values 210. The differentiable functions may be, e.g., polynomial functions or piecewise polynomial functions of any appropriate degree. A piecewise polynomial function refers to a function having a domain that is partitioned into multiple sub-domains, such that the function is specified by a respective (possibly different) polynomial on each sub-domain.

In some implementations, the latent parameters 210 parameterize the conditional layer weights by one or more B-splines. A B-spline (or basis spline) is a piecewise polynomial parametric function with bounded support and a specified level of smoothness up to $C^{d-1}$, where d is the degree of the B-spline, that approximately interpolates a set of control points ("knots"). More specifically, a B-spline S in $\mathbb{R}^d$ parameterized by a latent parameter φ can be represented as:

$$S(\phi) = \sum_{k=1}^{K} C_k \cdot B_k(\phi) \quad (2)$$

where $\{C_k\}_{k=1}^{K}$ are the control points in $\mathbb{R}^d$, and each $B_k(\bullet)$ is a piecewise polynomial function of the form:

$$B_k(\phi) = \sum_{t=0}^{d} a_t \phi^t \quad (3)$$

where $\{a_t\}_{t=0}^{d}$ are coefficients in ilk that can be determined from continuity and differentiability constraints on the B-spline. A B-spline having a specified level of smoothness (i.e., that can be differentiated a certain number of times) may be uniquely specified by the control points $\{C_k\}_{k=1}^{K}$. B-splines have the property that changes to each control point only changes the B-spline locally. This makes it easier to optimize the B-spline through adapting the position of each control point.

The latent parameters may parameterize the conditional layer weights in any of a variety of ways. A few examples follow.

In one example, the conditional layer may have one latent parameter that parametrizes a B-spline having control points in $\mathbb{R}^d$, where d is the number of conditional layer weights. In this example, the conditional layer may determine the values of the conditional layer weights as the position on the B-spline specified by the value of the latent parameter.

In another example, the conditional layer may have one latent parameter that parameterizes multiple B-splines having control points in $\mathbb{R}^d$, where d is the number of conditional layer weights. In this example, the conditional layer determines the values of the conditional layer weights as the sum of the respective positions specified on each B-spline by the value of the latent parameter.

In another example, the conditional layer weights may include multiple convolutional filters, and the conditional layer may have a respective latent parameter corresponding to each convolutional filter. In this example, the respective latent parameter corresponding to each convolutional filter may parametrize a respective B-spline having control points in $\mathbb{R}^b$, where b is the number of conditional layer weights specifying the convolutional filter. The conditional layer may determine the values of the conditional layer weights specifying each convolutional filter as the position on the corresponding B-spline specified by the value of the corresponding latent parameter. That is, the conditional layer may determine the convolutional filters ω as:

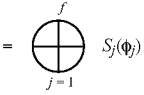

(4)

where f is the number of convolutional filters, $\{S_j\}_{j=1}^{f}$ are the B-splines, $\{\phi_j\}_{j=1}^{f}$ are the latent parameters, and $\oplus$ is a stacking operator that stacks the convolutional filters.

In another example, the conditional layer weights may include multiple convolutional filters, and the conditional layer may have a latent parameter that parametrizes a B-spline in $\mathbb{R}^a$, where a is the number of convolutional filters. In this example, the conditional layer determines the values of a "nested" latent variables, one for each convolutional filter, as the respective position on the B-spline that is specified by the value of the latent parameter. Each nested latent parameter may parameterize a respective B-spline in $\mathbb{R}^b$, where b is the number of conditional layer weights specifying each convolutional filter. The conditional layer may determine the values of the conditional layer weights specifying each convolutional filter as the position on the corresponding B-spline specified by the value of the corresponding nested latent parameter.

For illustrative purposes, in the conditional layer 200 depicted in FIG. 2, the latent parameter 210 specifies the position 212 on the B-spline 214. For illustrative purposes only, the B-spline is depicted as being two-dimensional, i.e., in $\mathbb{R}^2$.

The conditional layer 200 uses the values of the conditional layer weights 204 to process the layer input 202 to generate the layer output 206. The layer output 206 may subsequently be provided to a subsequent layer of the neural network, or the layer output 206 may be an output of the neural network.

Figure 3:
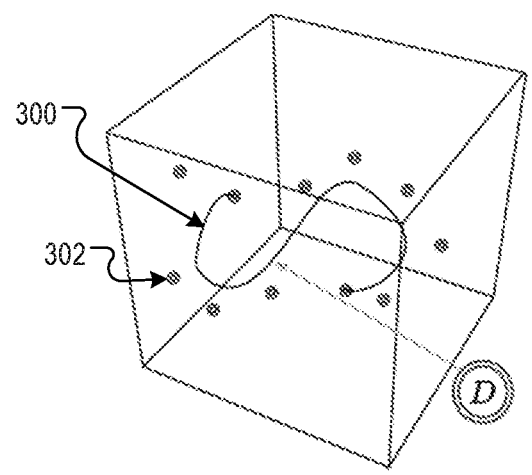
FIG. 3 is an illustration of an example B-spline.

FIG. 3 is an illustration of an example B-spline 300 in $\mathbb{R}^3$ that is specified by control points indicated as circles, e.g., the circle 302. AB-spline (or another appropriate differentiable mapping) can represent an embedding of possible values of the conditional layer weights of a conditional layer on a low-dimensional (e.g., one-dimensional) manifold, as described with reference to FIG. 2. Each point on the manifold (in the case of FIG. 3, each point on the B-spline 300) represents a possible set of values of the conditional layer weights.

Figure 4:
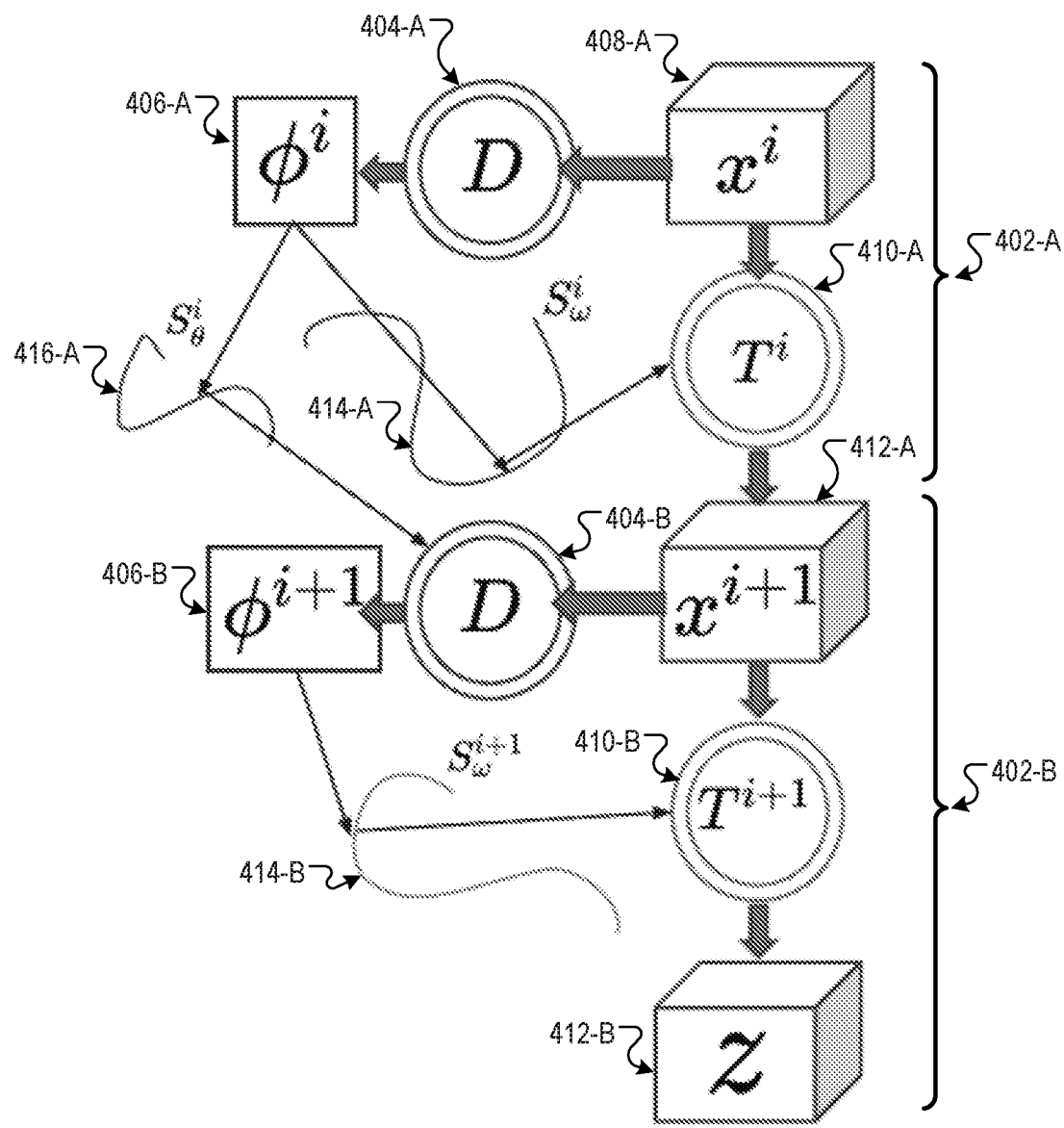
FIG. 4 is a block diagram that illustrates two conditional layers, where the neural network determines the decision parameters of the subsequent conditional layer based on the latent parameters of the preceding conditional layer.

FIG. 4 is a block diagram that illustrates the conditional layers 402-A and 402-B, where the neural network determines the decision parameters 404-B of the conditional layer 402-B based on the latent parameters 406-A of the preceding conditional layer 402-A.

The conditional layer 402-A processes the layer input 408-A in accordance with values of the conditional layer weights 410-A to generate the layer output 412-A, in the same manner as described with reference to FIG. 2. That is, the conditional layer 402-A uses the decision parameters 404-A to project the layer input 408-A onto one or more latent parameters 406-A that parameterize the conditional layer weights 410-A by one or more differentiable functions, e.g., the B-spline 414-A. The conditional layer 402-A determines the values of the conditional layer weights 410-A as the result of applying the differentiable functions (e.g., the B-spline 414-A) to the latent parameters 406-A, and then uses the conditional layer weights 410-A to generate the layer output 412-A.

In addition to parameterizing the conditional layer weights 410-A, the latent parameters 406-A of the conditional layer 402-A also parametrize the decision parameters 404-B of the subsequent conditional layer 402-B by one or more differentiable functions. The neural network determines the values of the decision parameters 404-B of the subsequent conditional layer 402-B as the result of applying the differentiable functions to the latent parameter values 406-A of the conditional layer 402-A. As before, the differentiable functions may be, e.g., polynomial functions or piecewise polynomial functions, e.g., the B-spline 416-A, and the latent parameters 406-A may parametrize the decision parameters 404-B similarly to how they parametrize the conditional layer weights 410-A.

The conditional layer 402-B uses the decision parameters 404-B to project the layer input 412-A onto one or more latent parameters 406-B that parametrize the conditional layer weights 410-B of the conditional layer 402-B by one or more differentiable functions, e.g., the B-spline 414-B. The conditional layer 402-B determines the values of the conditional layer weights 410-B as the result of applying the differentiable functions (e.g., the B-spline 414-B) to the latent parameters 406-B, and then uses the conditional layer weights 410-B to generate the layer output 412-B.

In some implementations, the neural network may directly condition the latent parameter values 406-B of the conditional layer 402-B on the latent parameter values 406-A of the preceding conditional layer 402-A. In one example, the neural network may determine the latent parameter values $\phi^{i+1}$ of the conditional layer 402-B as:

$$\phi^{i+1}=\alpha\cdot\phi^i+(1-\alpha)\cdot D(x^{i+1};\theta^{i+1}) \quad (5)$$

where α is a hyper-parameter in the interval [0,1], $\phi^i$ are the latent parameter values of the conditional layer 402-A, and $D(x^{i+1}; \theta^{i+1})$ is the projection of the layer input 412-A of the conditional layer 402-B using the decision parameters 404-B of the condition layer 402-B, e.g., as described with reference to equation (1). Conditioning the latent parameters of subsequent conditional layers on the latent parameters of preceding conditional layers may enforce a semantic relationship between sections of splines (or other parametrizing function) of consecutive conditional layers.

Figure 5:
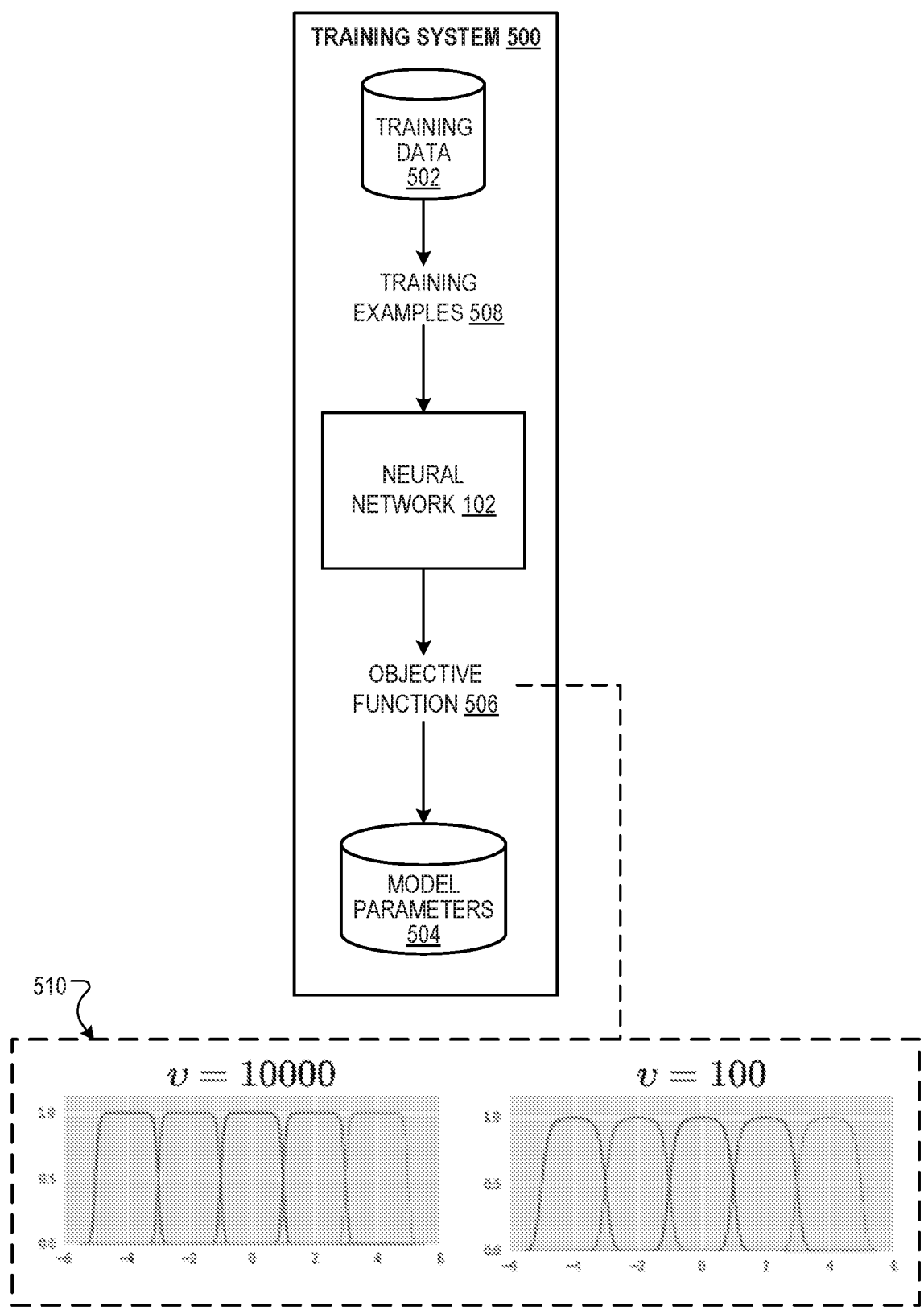
FIG. 5 illustrates an example data flow for training the neural network.

FIG. 5 illustrates an example data flow for training the neural network 102 using a training system 500 based on a set of training data 502. Training the neural network 102 refers to iteratively adjusting the model parameters 504 of the neural network 102 to (approximately) optimize an objective function 506, which will be described in more detail below.

Generally, training the neural network 102 includes, for each conditional layer, iteratively adjusting the parameter values of the differentiable functions that parametrize the conditional layer weights of the conditional layer. In one example, the differentiable functions parameterizing the conditional layer weights are polynomial functions or piecewise polynomial functions, and the coefficients of the terms of the polynomial or piecewise polynomial functions are adjusted at each training iteration. In another example, the differentiable functions parameterizing the conditional layer weights are B-splines, and the control points specifying the B-splines are adjusted at each training iteration. Adjusting a particular control point of a B-spline may have the effect of only changing the B-spline locally, i.e., in the vicinity of the particular control point, which can make it easier to optimize the B-spline through adapting the position of each control point.

For each conditional layer having a fixed set of decision parameters, the values of the decision parameters are iteratively adjusted over the training iterations. In some cases, the decision parameters of certain conditional layers are parameterized by one or more differentiable functions (e.g., polynomial or piecewise polynomial functions) of the latent parameters of a preceding conditional layer, as described with reference to FIG. 4. In these cases, the parameter values of the differentiable functions parametrizing the decision parameters are iteratively adjusted over the course of the training iterations. In one example, the differentiable functions parameterizing the decision parameters of a conditional layer may be B-splines, and the control points specifying the B-splines may be adjusted at each training iteration.

The training system 500 trains the neural network 102 based on a set of training data 502 composed of training examples, where each training example specifies: (i) a network input, and (ii) a target output that should be generated by the neural network 102 by processing the network input. At each training iteration, the training system 500 samples a "batch" of training examples 508 from the training data 502, and processes the network inputs of the training examples in accordance with the current values of the model parameters 504 of the neural network 102 to generate corresponding network outputs. The training system 500 then adjusts the current values of the model parameters 504 of the neural network 102 using gradients of an objective function 506 that depends on: (i) the network outputs generated by the neural network 102, and (ii) the corresponding target outputs specified by the training examples. The training system 500 can determine the gradients using, e.g., backpropagation techniques, and can use the gradients to adjust the current values of the model parameters using any appropriate gradient descent optimization technique, e.g., Adam or RMSprop.

Generally, the objective function 506 characterizes the accuracy of the network outputs generated by the neural network 102 by measuring a similarity between the network outputs and the corresponding target outputs specified by the training examples, e.g., using a cross-entropy loss term or a squared-error loss term.

The objective function 506 may also include additional terms that encourage the neural network 102 to fully utilize the representational capacity of the conditional layers, and to "specialize" respective portions of the continuous range of possible latent parameter values to handle network inputs corresponding to certain target outputs. To this end, the objective function 506 may measure the mutual information between the values of the latent parameters of the conditional neural network layers and the target outputs specified by the training examples. In one example, the objective function $\mathcal{L}$ may be given by:

$$\mathcal{L} = \lambda \cdot \mathcal{L}_{acc} + (1-\lambda) \cdot \sum_{i=1}^{I} \mathcal{L}_{reg}^{i} \quad (6)$$

$$\mathcal{L}_{reg}^{i} = -w_u \cdot H(\phi^i) + w_s \cdot H(\phi^i \mid Y) \quad (7)$$

where $\lambda$ is a hyper-parameter between 0 and 1, $\mathcal{L}_{acc}$ measures the similarity between the network outputs and the target outputs, I is the total number of conditional layers, i indexes the conditional layers, $\mathcal{L}_{reg}$ characterizes the mutual information between the latent parameter of conditional layer i and the target outputs in the current batch of training examples, $H(\phi^i)$ is the entropy of the distribution $P(\phi^i)$ of the latent parameter of conditional layer i, $H(\phi^i|Y)$ is the entropy of the distribution $P(\phi^i|Y)$ of the latent parameter of conditional layer i conditioned on the target outputs, and $w_u$ and $w_s$ are hyper-parameters.

Referring to equation (7), by maximizing the entropies $\{H(\phi^i)\}_{i=1}^{I}$ of the distributions $\{P(\phi^i)\}_{i=1}^{I}$ of the latent parameters of the conditional layers, the objective function may encourage the neural network to generate latent parameters that are more evenly distributed throughout the continuous range of possible latent parameter values. This can result in the neural network 102 more fully utilizing the representational capacity of the conditional layers. By minimizing the entropies $\{H(\phi^i|Y)\}_{i=1}^{I}$ of the distributions $\{P(\phi^i|Y)\}_{i=1}^{I}$ of the latent parameters of the conditional layers conditioned on the target outputs, the objective function may encourage the neural network to specialize respective portions of the continuous range of possible latent parameter values to handle network inputs having certain target outputs.

The training system 500 can approximate the distribution of the latent parameter $P(\phi^i)$ and the distribution of the latent parameter conditioned on the target output $P(\phi^i|Y)$ based on the sampled latent parameter-target outputs pairs $\{(\phi_n^i, y_n)\}_{i=1}^{N}$ of the current batch of N training examples, where $y_n$ is the target output specified by training example n. To this end, the training system 500 may quantize the continuous range of possible latent parameter values (e.g., [0,1]) into B bins, and count the samples that fall into each bin using a soft (i.e., differentiable) quantization function, e.g., the soft quantization function $U(\phi; c_b, w_b, v)$ given by:

$$U(\phi; c_b, w_b, v) = 1 - \left(1 + v^{\left(\frac{2(\phi-c_b)}{w_b}\right)^2}\right)^{-1} \quad (8)$$

where $U(\bullet)$ returns almost 1 when the latent parameter $\phi$ is inside the bin described by the center $c_b$ and the width $w_b$, and almost 0 otherwise. The parameter v controls the sharpness (slope) of the soft quantization. The illustration 510 shows examples of the soft quantization function $U(\bullet)$ with respective bin centers and slopes. It can be appreciated that a higher value of v results in a sharper quantization.

Using the soft quantization function U(•), e.g., as described with reference to equation (8), the training system 500 can discretize the continuous latent parameter $\phi^i$ with B bins, which approximates $\phi^i$ as a discrete latent parameter N. The training system 500 can approximate the entropy $H(\phi^i)$ of the distribution $P(\phi^i)$ of the latent parameter $\phi^i$ as:

$$H(\phi^i) \approx -\sum_{b=1}^{B} P(\Lambda^i = b) \log P(\Lambda^i = b) \quad (9)$$

$$P(\Lambda^i = b) \approx \frac{\sum_{n=1}^{N} U(\phi_n^i; c_b, w_b, v)}{\sum_{n=1}^{N} \sum_{b'=1}^{B} U(\phi_n^i; c_{b'}, w_{b'}, v)} \quad (10)$$

where b indexes the bins and n indexes the training examples of the current batch. Similarly, the training system 500 can approximate the entropy $H(\phi^i|Y)$ of the distribution $P(\phi^i|Y)$ of the latent parameter $\phi^i$ conditioned on the target outputs as:

$$H(\phi^i | Y) \approx -\sum_{c=1}^{C} P(Y = c) \sum_{b=1}^{B} P(\Lambda^i = b | Y = c) \log P(\Lambda^i = b | Y = c) \quad (11)$$

$$P(\Lambda^i = b | Y = c) \approx \frac{\sum_{n=1}^{N} U(\phi_n^i; c_b, w_b, v) \cdot \mathbb{I}(y_n = c)}{\sum_{n=1}^{N} \sum_{b'=1}^{B} U(\phi_n^i; c_{b'}, w_{b'}, v) \cdot \mathbb{I}(y_n = c)} \quad (12)$$

where c indexes the C possible target outputs, and $\mathbb{I}(y_n=c)$ returns 1 if target output for training example n is c, and 0 otherwise.

Characterizing the mutual information between the values of the latent parameters and the target outputs using a soft quantization function causes the objective function to be differentiable, which facilitates the training of the neural network 102.

The training system 500 may continue training the neural network 102 until a training termination criterion is met, e.g., until a predetermined number of training iterations have been performed, or until the accuracy of the neural network 102 (e.g., evaluated on a held out validation set) satisfies a predetermined threshold.

Figure 6:
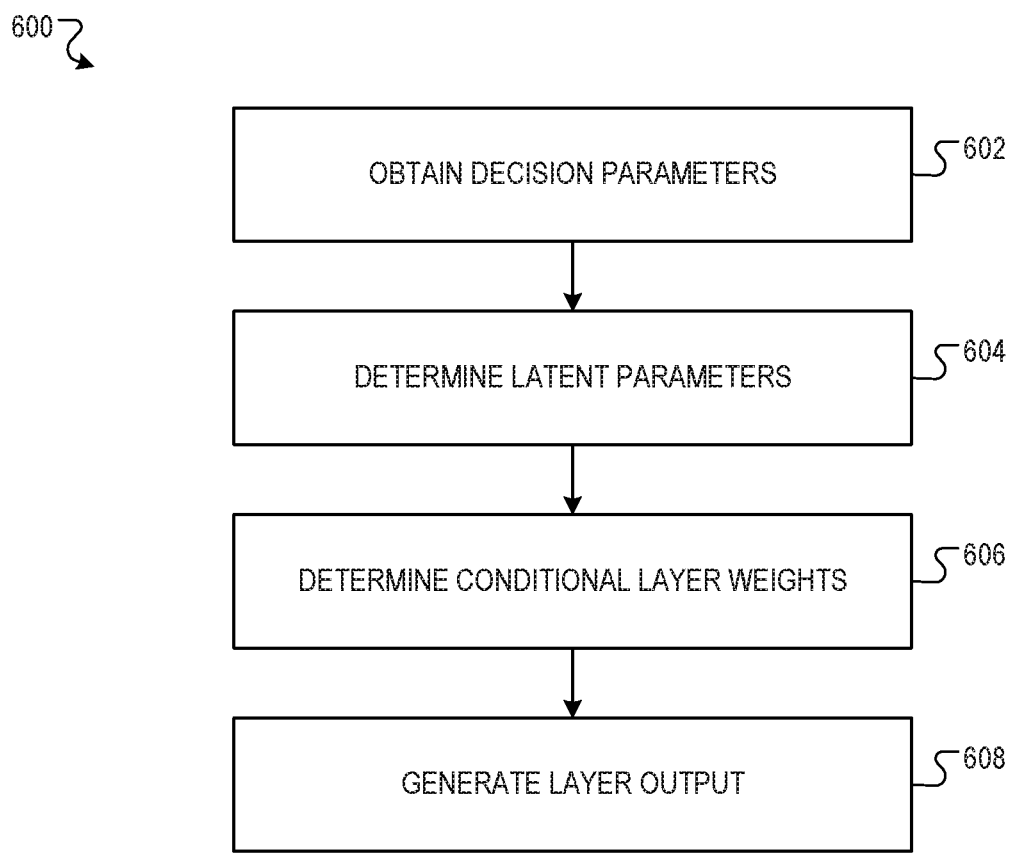
FIG. 6 is a flow diagram of an example process for processing a layer input using a conditional layer to generate a layer output.

FIG. 6 is a flow diagram of an example process 600 for processing a layer input using a conditional layer to generate a layer output. For convenience, the process 600 will be described as being performed by a system of one or more computers located in one or more locations. For example, a neural network system, e.g., the neural network system 100 of FIG. 1, appropriately programmed in accordance with this specification, can perform the process 600.

The system obtains the values of the decision parameters of the conditional layer 602. In some cases, the values of the decision parameters of the conditional layer are determined during training and are held fixed thereafter. In some other cases, the system determines the values of the decision parameters of the conditional layer from values of one or more latent parameters of a preceding conditional layer. More specifically, the system may determine the values of the decision parameters of the conditional layer in accordance with a parametrization of the decision parameters by the latent parameters of the preceding conditional layer, e.g., as a B-spline or as a hypersurface defined as a sum of B-splines.

The system determines the values of the latent parameters of the conditional layer from a continuous set of possible latent parameter values by processing the layer input and the decision parameters 604. The system may determine the values of the latent parameters by processing the layer input and the decision parameters using a differentiable mapping, e.g., by determining an inner product between the layer input and the decision parameters, and processing the result of the inner product by a sigmoid function. In some cases, the system determines the latent parameter values for the conditional layer from: (i) the result of processing the layer input and the decision parameters, and (ii) the latent parameter values of a preceding conditional layer. In some cases, the number of latent parameters may be substantially less than the dimensionality of the layer input and the dimensionality of the conditional layer weights, e.g., by multiple orders of magnitude.

The system determines the values of the conditional layer weights from the values of the latent parameters 606. For example, the system may determine the values of the conditional layer weights in accordance with a parametrization of the conditional layer weights by the latent parameters, e.g., as a B-spline or a hypersurface defined by a sum of B-splines. In this example, each B-spline may be defined by a set of knots (control points) that determined during training.

In one implementation, the conditional layer weights include weights of multiple convolutional filters, and the latent parameters parametrize multiple nested latent parameters, each of which parameterizes the weights of a corresponding convolutional filter. In these implementations, the system determines the values of the nested latent parameters from the values of the latent parameters in accordance with the parameterization of the nested latent parameters by the latent parameters. Then, for each convolutional filter, the system determines the values of the weights of the convolutional filter from the value of the corresponding nested latent variable in accordance with the parameterization of the weights of the convolutional filter by the nested latent parameter.

The system processes the layer input in accordance with the values of the conditional layer weights to generate the layer output 608. For example, the conditional layer may be a fully-connected layer, where the conditional layer weights specify a weight matrix and the conditional layer generates the layer output by multiplying the weight matrix by the layer input. As another example, the conditional layer may be a convolutional layer, where the conditional layer weights specify multiple convolutional filters and the conditional layer generates the layer output by convolving the convolutional filters with the layer input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more computers, the method comprising:
  processing a network input using a neural network comprising a plurality of neural network layers to generate a network output, wherein each neural network layer is configured to process a respective layer input in accordance with respective values of a plurality of layer weights to generate a respective layer output, wherein one or more of the neural network layers is a conditional neural network layer, and wherein processing a layer input using a conditional neural network layer to generate a layer output comprises:
    obtaining values of one or more decision parameters of the conditional neural network layer;
    processing (i) the layer input, and (ii) the decision parameters of the conditional neural network layer, to determine values of one or more latent parameters of the conditional neural network layer from a continuous set of possible latent parameter values, wherein the one or more latent parameters of the conditional neural network layer parameterize a respective value of each of a plurality of layer weights of the conditional neural network layer as a B-spline or as a hyper-surface defined as a sum of B-splines;
    determining the respective value of each of the plurality of layer weights of the conditional neural network layer from the values of the latent parameters of the conditional neural network layer; and
    processing the layer input in accordance with the values of the plurality of layer weights of the conditional neural network layer, determined in accordance with the parametrization of the plurality of layer weights of the conditional neural network layer as the B-spline or the hyper-surface defined as the sum of B-splines, to generate the layer output;
  wherein each B-spline is defined by a plurality of knots, and wherein the plurality of knots of each B-spline have been trained jointly with the decision parameters of the conditional neural network layer to optimize an objective function that measures a performance of the neural network on a machine learning task.

2. The method of claim 1, wherein processing (i) the layer input, and (ii) the decision parameters of the conditional neural network layer, to determine the values of the latent parameters of the conditional neural network layer from a continuous set of possible latent parameter values comprises applying a differentiable mapping, the differentiable mapping being a mapping of the layer input and the decision parameters of the conditional neural network layer to the values of the latent parameters of the conditional neural network layer.

3. The method of claim 2, wherein applying the differentiable mapping comprises:
  determining an inner product between the layer input and the decision parameters of the conditional neural network layer; and
  processing the inner product by a sigmoid function.

4. The method of claim 2, further comprising:
  determining the values of the latent parameters of the conditional neural network layer from: (i) an output of the differentiable mapping, and (ii) values of latent parameters of a preceding conditional neural network layer in the neural network that precedes the conditional neural network layer in an ordering of the neural network layers of the neural network.

5. The method of claim 1, wherein the continuous set of possible latent parameter values is an interval between 0 and 1.

6. The method of claim 1, wherein:
  the plurality of layer weights of the conditional neural network layer comprise weights of a plurality of convolutional filters;

the latent parameters of the conditional neural network layer parametrize a plurality of nested latent parameters of the conditional neural network layer;

each nested latent parameter of the conditional neural network layer parametrizes weights of a corresponding convolutional filter; and determining the respective value of each of the plurality of layer weights of the conditional neural network layer from the values of the latent parameters of the conditional neural network layer comprises:

determining values of the plurality of nested latent parameters of the conditional neural network layer from the values of the latent parameters of the conditional neural network layer in accordance with the parametrization of the plurality of nested latent parameters of the conditional neural network layer by the latent parameters of the conditional neural network layer; and for each convolutional filter, determining values of the weights of the convolutional filter from a value of the nested latent parameter corresponding to the convolutional filter in accordance with the parametrization of the weights of the convolutional filter by the corresponding nested latent parameter.

7. The method of claim 1, wherein a number of latent parameters of the conditional neural network layer is less than a dimensionality of the plurality of layer weights of the conditional neural network layer.

8. The method of claim 1, wherein obtaining the values of the decision parameters of the conditional neural network layer comprises:

obtaining the values of the decision parameters of the conditional neural network layer which are determined when the neural network is trained.

9. The method of claim 1, wherein obtaining the values of the decision parameters of the conditional neural network layer comprises:

determining the values of the decision parameters of the conditional neural network layer from values of one or more latent parameters of a preceding conditional neural network layer that precedes the conditional neural network layer in an ordering of the neural network layers of the neural network.

10. The method of claim 9, wherein the latent parameters of the preceding conditional neural network layer parametrize the decision parameters of the conditional neural network layer, and wherein determining the values of the decision parameters of the conditional neural network layer comprises:

determining the values of the decision parameters of the conditional neural network layer from the values of the latent parameters of the preceding conditional neural network layer in accordance with the parametrization of the decision parameters of the conditional neural network layer by the latent parameters of the preceding conditional neural network layer.

11. The method of claim 10, wherein the latent parameters of the preceding conditional neural network layer parameterize the decision parameters of the conditional neural network layer as a B-spline or as a hypersurface defined as a sum of multiple B-splines.

12. The method of claim 1, wherein the neural network is trained based on a set of training data comprising a plurality of training examples to jointly optimize: i) an accuracy of the neural network, and (ii) a measure of mutual information between the values of the latent parameters of the conditional neural network layer and labels for the training examples included in the training data.

13. The method of claim 12, wherein the measure of mutual information is determined using a soft quantization function.

14. The method of claim 1, wherein the network input comprises an image or audio signal and the network output comprises data characterizing the image or audio signal.

15. One or more non-transitory computer storage media storing instructions that when executed by one or more computers cause the one or more computers to perform operations comprising:

processing a network input using a neural network comprising a plurality of neural network layers to generate a network output, wherein each neural network layer is configured to process a respective layer input in accordance with respective values of a plurality of layer weights to generate a respective layer output, wherein one or more of the neural network layers is a conditional neural network layer, and wherein processing a layer input using a conditional neural network layer to generate a layer output comprises:

obtaining values of one or more decision parameters of the conditional neural network layer;

processing (i) the layer input, and (ii) the decision parameters of the conditional neural network layer, to determine values of one or more latent parameters of the conditional neural network layer from a continuous set of possible latent parameter values, wherein the one or more latent parameters of the conditional neural network layer parameterize a respective value of each of a plurality of layer weights of the conditional neural network layer as a B-spline or as a hyper-surface defined as a sum of B-splines;

determining the respective value of each of the plurality of layer weights of the conditional neural network layer from the values of the latent parameters of the conditional neural network layer; and processing the layer input in accordance with the values of the plurality of layer weights of the conditional neural network layer, determined in accordance with the parametrization of the plurality of layer weights of the conditional neural network layer as the B-spline or the hyper-surface defined as the sum of B-splines, to generate the layer output;

wherein each B-spline is defined by a plurality of knots, and wherein the plurality of knots of each B-spline have been trained jointly with the decision parameters of the conditional neural network layer to optimize an objective function that measures a performance of the neural network on a machine learning task.

16. A system comprising one or more computers and one or more storage devices storing instructions that when executed by the one or more computers cause the one or more computers to perform operations comprising:

processing a network input using a neural network comprising a plurality of neural network layers to generate a network output, wherein each neural network layer is configured to process a respective layer input in accordance with respective values of a plurality of layer weights to generate a respective layer output, wherein one or more of the neural network layers is a conditional neural network layer, and wherein processing a layer input using a conditional neural network layer to generate a layer output comprises:

obtaining values of one or more decision parameters of the conditional neural network layer;

processing (i) the layer input, and (ii) the decision parameters of the conditional neural network layer, to determine values of one or more latent parameters of the conditional neural network layer from a continuous set of possible latent parameter values, wherein the one or more latent parameters of the conditional neural network layer parameterize a respective value of each of a plurality of layer weights of the conditional neural network layer as a B-spline or as a hyper-surface defined as a sum of B-splines;

determining the respective value of each of the plurality of layer weights of the conditional neural network layer from the values of the latent parameters of the conditional neural network layer; and processing the layer input in accordance with the values of the plurality of layer weights of the conditional neural network layer, determined in accordance with the parametrization of the plurality of layer weights of the conditional neural network layer as the B-spline or the hyper-surface defined as the sum of B-splines, to generate the layer output;

wherein each B-spline is defined by a plurality of knots, and wherein the plurality of knots of each B-spline have been trained jointly with the decision parameters of the conditional neural network layer to optimize an objective function that measures a performance of the neural network on a machine learning task.

17. The system of claim 16, wherein processing (i) the layer input, and (ii) the decision parameters of the conditional neural network layer, to determine the values of the latent parameters of the conditional neural network layer from a continuous set of possible latent parameter values comprises applying a differentiable mapping, the differentiable mapping being a mapping of the layer input and the decision parameters of the conditional neural network layer to the values of the latent parameters of the conditional neural network layer.

18. The system of claim 17, wherein applying the differentiable mapping comprises:

determining an inner product between the layer input and the decision parameters of the conditional neural network layer; and processing the inner product by a sigmoid function.

19. The system of claim 17, wherein the operations further comprise:

determining the values of the latent parameters of the conditional neural network layer from: (i) an output of the differentiable mapping, and (ii) values of latent parameters of a preceding conditional neural network layer in the neural network that precedes the conditional neural network layer in an ordering of the neural network layers of the neural network.

20. The system of claim 16, wherein the continuous set of possible latent parameter values is an interval between 0 and 1.

* * * * *